United States Patent
Yamaguchi et al.

(10) Patent No.: US 6,660,392 B2
(45) Date of Patent: Dec. 9, 2003

(54) ANTI-REFLECTION FILM AND OPTICAL MEMBERS USING THE SAME

(75) Inventors: Kouichi Yamaguchi, Takasaki (JP); Hiromasa Yamaguchi, Annaka (JP); Hirofumi Kishita, Annaka (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 33 days.

(21) Appl. No.: 10/004,889

(22) Filed: Dec. 7, 2001

(65) Prior Publication Data

US 2002/0105728 A1 Aug. 8, 2002

(30) Foreign Application Priority Data

Dec. 8, 2000 (JP) .................................... 2000-374881

(51) Int. Cl.$^7$ ............................. B32B 18/00; B32B 9/04
(52) U.S. Cl. .................. 428/446; 428/447; 428/448; 528/28; 528/42
(58) Field of Search ............... 528/28, 42; 428/446, 428/447, 448

(56) References Cited

U.S. PATENT DOCUMENTS

| | | | |
|---|---|---|---|
| 4,469,522 A | * 9/1984 | Matsumoto | 524/588 |
| 4,678,688 A | * 7/1987 | Itoh et al. | 427/387 |
| 5,166,104 A | * 11/1992 | Funayama et al. | 501/95.1 |
| 5,210,253 A | 5/1993 | Kinami et al. | |
| 5,281,695 A | 1/1994 | Kishita et al. | |
| 5,326,611 A | 7/1994 | Kishita et al. | |
| 5,358,996 A | 10/1994 | Takago et al. | |
| 5,476,717 A | 12/1995 | Floch | |
| 5,763,061 A | 6/1998 | Ochiai et al. | |
| 6,200,684 B1 | 3/2001 | Yamaguchi et al. | |
| 6,464,822 B1 | * 10/2002 | Choi et al. | 156/307.1 |
| 6,534,184 B2 | * 3/2003 | Knasiak et al. | 428/447 |

FOREIGN PATENT DOCUMENTS

| | | | | |
|---|---|---|---|---|
| GB | 2266309 A | * 10/1993 | ............ | C08G/77/62 |
| JP | 07287101 A | * 10/1995 | ............ | G02B/1/11 |

OTHER PUBLICATIONS

"Hackh's Chemical Dictionary, 4$^{th}$ Edition", Mcgraw Hill, 1969, p. 610.*

* cited by examiner

Primary Examiner—Robert Dawson
Assistant Examiner—Marc S Zimmer
(74) Attorney, Agent, or Firm—Oblon, Spivak, McClelland, Maier & Neustadt, P.C.

(57) ABSTRACT

An anti-reflection film which includes an inorganic anti-reflection layer including a silicon dioxide-based inorganic layer and having a monolayer structure or plural-layer structure, and a stain-resistant layer provided as a surface layer, is provided. The stain-resistant layer is composed of a cured product of a particular fluorine-containing silazane compound. An optical member having the anti-reflection film on a substrate, such as an optical element, is also provided. These have good stain resistance, wipe off cleanability, mar resistance and water and oil repellency, and these properties have good durability.

19 Claims, No Drawings

ANTI-REFLECTION FILM AND OPTICAL MEMBERS USING THE SAME

BACKGROUND OF THE INVENTION

1. Field of the Invention

The present invention relates to an anti-reflection film with good stain resistance, and optical members using the film.

2. Description of the Prior Art

On anti-reflection films which are generally formed on the surface of display units are liable to be stained with dirt from hands, fingerprint, sweat, or hairdressing. For this, reflectance at surface may change, and the stain may become conspicuous and look white, making unclear the contents of indication, so that there is a problem that stains stand out compared to mere transparent plates. Accordingly, it has been sought to provide an anti-reflection film excellent in stain resistance and stain-cleanabillty for a long period of time.

With the aim of improving the stain resistance, Japanese Post-Examination Patent Publication (kokoku) No. 6-5324 discloses an optical article with anti-stain resistance, comprising an anti-reflection layer of a monolayered or multi-layered inorganic layer having a surface layer formed by PVD (Physical Vapor Deposition) and mainly comprised of silicon dioxide, and a layer of a cured product of an organopolysiloxane polymer or a perfluoroalkyl group-containing polymer formed on said anti-reflection layer.

However, if to this optical article is attached a human-derived stain such as dirt from hands or fingerprint, the stain can be wiped off with common tissue paper with difficulty. Furthermore, when the tissue paper is used, the stain may be pressed and extended on the thin anti-reflection film, or when the anti-reflection film is scraped strongly with the paper it may be damaged. Thus, there is a problem that the stain cannot be removed satisfactorily.

SUMMARY OF THE INVENTION

In view of the situation described above, an object of the present invention is to provide an anti-reflection film with good performance in stain resistance, wipe off cleanability, mar resistance, and water repellency, and good durability of these properties, and also to provide optical members having the film on a supporting substrate and good performance in the same properties.

The present inventors have studied in various ways, and as a result have discovered that formation of a cured product layer of a particular fluorine-containing silazane compound described below as the surface layer on the anti-reflection film enables achievement of the above stated object, thus leading to the present invention.

Thus, as a first aspect, the present invention provides an anti-reflection film comprising an inorganic anti-reflection layer comprising a silicon dioxide-based inorganic layer and having a monolayer structure or plural-layer structure, and a stain-resistant layer provided as a surface layer, said stain-resistant layer comprising a cured product of a fluorine-containing silazane compound represented by the formula (1):

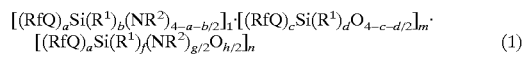

(1)

wherein $R^1$ are the same or different and each represent a hydrogen atom, or an unsubstituted or substituted monovalent hydrocarbon group; $R^2$ are the same or different and each represent a hydrogen atom or an alkyl group; Rf are the same or different and each represent a perfluoroalkyl group with 1–20 carbon atoms or perfluoroalkylether group with 2–35 carbon atoms; Q is a divalent organic group with 2–5 carbon atoms; in each of the first structural units, independently, a represents an integer of 1–3, and b is an integer of 0–2, provided that a+b represents an integer of 1–3; in each of the second structural units, independently, c represents an integer of 0–2, and d is an integer of 1–3, provided that c+d represents an integer of 1–3; in each of the third structural units, e and f independently represent an integer of 0–2, and g and h each represents an integer of 1 or 2, provided that e+f+g+h=4; and l, m and n are each a number of 1 or greater.

The fluorine-containing silazane compound is a block polymer containing blocks of Si—N units and Si—O units.

As a second aspect, the present invention provides an optical member comprising a supporting substrate and said anti-reflection film formed on the supporting substrate.

DETAILED DESCRIPTION OF THE PREFERRED EMBODIMENT

The present invention will now be described in detail.

The anti-reflection film according to the present invention comprises an inorganic anti-reflection layer comprising a silicon dioxide-based inorganic layer and having a monolayer structure or plural-layer structure, and a stain-resistant layer provided as a surface layer, and the stain-resistant layer is comprised of a cured product of the fluorine-containing silazane compound having the formula (1). The inorganic anti-reflection layer is firstly described.

Inorganic Anti-Reflection Layer

The inorganic anti-reflection layer in the anti-reflection film is a part substantially responsible for the anti-reflection function, and it may has a monolayer structure or plural-layer structure.

Accordingly, the inorganic anti-reflection layer may be formed as an anti-reflection layer having any of the structures described in, for example, A. VASICEK, OPTICS OF THIN FILMS, p. 159–283, NORTH-HOLLAND PUBLISHING COMPANY, AMSTERDAM (1960), Japanese Laid-Open Patent Publication (kokai) Nos. 58-46301, 59-49501, 59-50401, and 1-294709, and Japanese Post-Examination Patent Publication (kokoku) No. 6-5324.

As the inorganic compound used for forming the inorganic anti-reflection layer, can be used inorganic oxides, inorganic halides, and their composites, The inorganic compound specifically includes, e.g., inorganic oxides such as $SiO_2$, $ZrO_2$, $Al_2O_3$, $Y_2O_3$, and $TiO_2$, inorganic fluorides such as $MgF_2$, $BaF_2$, $CaF_2$, $LaF_2$, LiF, NaF, and $SrF_2$, and their composites.

When the inorganic anti-reflection layer has a monolayer structure, it is preferably a silicon dioxide-based inorganic layer in view of a high surface hardness and good adhesion to the stain-resistant layer being obtained. When It is a plural-layer structure, the layer adjacent to the surface layer is preferably a silicon dioxide-based inorganic layer.

The inorganic anti-reflection layer can be formed according to the production processes described below as a layer of one or more inorganic compounds or a layer of a mixture of an inorganic compound described above and a binder polymer. When it is formed as a layer of a mixture of an inorganic compound described above and a binder polymer, the mixture preferably contains the inorganic compound in a quantity of 30% or more from the viewpoint of hardness and surface stain resistance. As the binder polymer, any suitable polymer can be used and there is no particular limitation: however, a variety of organosilicon compounds and their hydrolysates capable of forming organopolysiloxanes are preferred in view of hardness, etc.

The formation of the inorganic anti-reflection layer can be performed by a suitable method for forming thin coating film. e.g., PVD methods such as vacuum deposition, spattering, and ion plating, fluid coating methods such as spin coating, dip coating, curtain flow coating, roll coating, spray coating, flow coating.

In the PVD methods, inorganic oxides such as $SiO_2$ and inorganic halides such as $MgF_2$ are preferably used. Especially the silicon dioxide-based inorganic layer to be present on the side of the surface layer is preferably formed by a PVD method as a layer mainly comprised of silicon dioxide from the viewpoint of a higher surface hardness and a good adhesion with the stain-resistant layer formed as the surface layer.

The anti-reflection layer preferably has a plural-layer structure in view of the anti-reflection effect, in particular a plural-layer structure inside which one or more layers are present which have a higher refractive index than the silicon dioxide-based inorganic layer which is present on the side of the surface layer. In that case, thickness, refractive index, etc. of each layer can be set as disclosed in the above-described A. VASICEK, OPTICS OF THIN FILMS, and so forth.

In the anti-reflection layer, in order to prevent dust or the like from attaching thereto due to electrostatic charge, a conductive layer may be incorporated which has effects of removing static electricity and shielding electromagnetic waves. The conductive layer includes, for example, a thin metallic layer of gold, silver or aluminum, and transparent conductive thin layers comprised of an inorganic oxide layer of tin oxide, indium oxide, and a mixture thereof (ITO). In the visible light range, inorganic oxide-based transparent conductive thin layers having very little absorption of light are particularly preferred.

Stain-Resistant Layer

In the anti-reflection film according to the present invention, the stain-resistant layer is formed on the above-described inorganic anti-reflection layer. The stain-resistant layer is comprised of the cured product of a fluorine-containing silazane compound having the following formula (1):

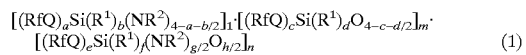

$$[(RfQ)_aSi(R^1)_b(NR^2)_{4-a-b/2}]_l \cdot [(RfQ)_cSi(R^1)_dO_{4-c-d/2}]_m \cdot [(RfQ)_eSi(R^1)_f(NR^2)_{g/2}O_{h/2}]_n \quad (1)$$

wherein $R^1$ may be the same or different and each represent a hydrogen atom or an unsubstituted or substituted monovalent hydrocarbon group; $R^2$ may be the same or different and each represent a hydrogen atom or an alkyl group; Rf may be the same or different and each represent a perfluoroalkyl group with 1–20 carbon atoms or a perfluoroalkylether group with 2–35 carbon atoms; Q is a divalent organic group with 2–5 carbon atoms; in each of the first structural units, independently, a represents an integer of 1–3, and b is an integer of 0–2, provided that a+b is an integer of 1–3; in each of the second structural units, independently, c represents an integer of 0–2, and d is an integer of 1–3, provided that c+d is an integer of 1–3; in each of the third structural units, e and f independently represent an integer of 0–2, and g and h each represent an integer of 1 or 2, provided that e+f+g+h=4; and l, m and n are each a number of 1 or greater.

In said formula (1), $R^1$ are each a hydrogen atom or an unsubstituted or substituted monovalent hydrocarbon group. The unsubstituted or substituted monovalent hydrocarbon group includes, for example, alkyl groups such as methyl, ethyl, propyl, butyl, hexyl, or the like, alkenyl groups such as vinyl, allyl or the like, aryl groups such as phenyl, tolyl or the like, cycloalkyl groups such as cyclohexyl, or corresponding substituted halogenated hydrocarbon groups in which hydrogen atoms bonded to carbon atoms of the above-exemplified groups have been partly or completely substituted with halogen atoms, preferably having 1–10 carbon atoms, more preferably having 1–6 carbon atoms, e.g., 3,3,3-trifluoropropyl, $CF_3CF_2CF_2CH_2CH_2-$ or the like; $R^2$ is a hydrogen atom or an alkyl group, such as methyl, ethyl, propyl, butyl, and hexyl, preferably a hydrogen atom; Rf is a perfluoroalkyl group, for example, represented by the formula: $C_iF_{2i+1}-$ where i is an integer of 1–20, or a perfluoroalkylether group represented by, for example, the formula:

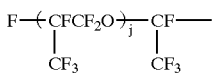

$$F-(CFCF_2O)_j-CF- \\ \quad\quad\;\; | \quad\quad\quad\;\; | \\ \quad\quad\;\; CF_3 \quad\quad\;\; CF_3$$

where j is an integer of 1–50;

Q is a divalent organic group with 2–5 carbon atoms, for example, alkylene groups such as $-CH_2CH_2-$ or $-CH_2CH_2CH_2-$, etheric oxygen-containing alkylene groups such as $-CH_2OCH_2CH_2CH_2-$, or alkylamide groups such as $-CONHCH_2CH_2CH_2-$.

The a to h are each an integer as described above, provided that a+b, c+d and e+f+g+h are each an integer as described above, and in each of the structural units these may be the same or different. The l, m and n are each an integer of 1 or more, provided that l+m ranges preferably from 10 to 500. If the value of l+m is smaller than the range stated above, the cured film obtained may be poor in hardness; however, on the other side, if the value of l+m is greater than the range above, curability may be poor. The n is an integer of normally 2 to 100, preferably 5 to 70.

Furthermore, l and m in the silazane compound represented by the formula (1) described above preferably have a proportion of 0.05 to 0.5 in terms of m/(l+m) in view of the curing rate of the the silazane compound, and adhesion and surface properties of a cured product obtained by curing to the anti-reflection layer.

The layer of a cured product comprised of said fluorine-containing silazane compound is excellent in water repellency, oil repellency, strain resistance, chemical resistance, lubricating properties, and release properties, and acts as a stain-resistant layer. And, since it strongly adheres to the silicon dioxide-based inorganic layer formed on the surface side within the anti-reflection layer, the effects are durable for a long period of time.

Synthesis of Fluorine-containing Silazane Compound

The fluorine-containing silazane compound represented by the general formula (1) can be produced, for example, by reacting an organosilane represented by the general formula (2):

$$(RfQ)_aSi(R^1)_bX_{4-a-b} \quad (2)$$

wherein $R^1$, Rf, Q, a, b and a+b are as defined above; and X is a halogen atom, e.g., bromine and chlorine, and an organopolysiloxane represented by the average compositional formula (3):

$$(RfQ)_p Si(R^1)_q X_r O_{4-p-q-r/2} \quad (3)$$

wherein $R^1$, Rf, Q and X are as defined above, and p, q and r are numbers of $0 \leq p < 3$, $0 < q < 3$, and $0 < r < 3$, respectively, provided that they satisfy $p+q+r<4$, with at least one compound selected from the group consisting of ammonia and a primary amine.

Formation of Stain-Resistant Layer

To form the stain-resistant layer, any method described in respect of the anti-reflection layer can be used. From the viewpoint of anti-reflection effect evenness and control of interference colors caused by reflection, preferred is one selected from the fluid coating methods such as spin coating, dip coating and curtain flow coating, and vacuum deposition, or combined use of two or more of these methods. From the viewpoint of workability, preferred is the method in which a coating liquid is impregnated in paper or fabric and then applied and cast on the anti-reflection layer.

The coating liquid stated above can be prepared by dissolving or dispersing the fluorine-containing silazane compound in a volatile solvent. The volatile solvent for this purpose is preferably selected with consideration of stability and solubility of the composition, and wetability by the solvent of the layer on the surface layer side, particularly the silicon dioxide-based inorganic layer within the inorganic anti-reflection layer, and rate of volatilization. Preferably, for example, a solvent of the solvents listed below or a mixed solvent of two or more of them can be used.

The volatile solvents include, for example, fluorine-modified aliphatic hydrocarbon solvents such as perfluoroheptane and perfluorooctane, fluorine-modified aromatic hydrocarbon solvents such as m-xylene hexafluoride and benzotrifluoride, fluorine-modified ether solvents such as methyl perfluorobutyl ether and perfluoro-2-butyltetrahydrofuran, hydrocarbon solvents such as petroleum benzine, mineral spirit, toluene, and xylene, and ketone solvents such as acetone, methyl ethyl ketone, and methyl isobutyl ketone. Out of them, preferred are fluorine-modified solvents from the viewpoint of dissolving power, and particularly preferred are m-xylene hexafluoride and perfluoro-2-butyltetrahydrofuran.

To the coating liquid may be added a hydrolysis-condensation catalyst in order to accelerate the hydrolysis and condensation of the fluorine-containing silazane compound. The catalyst includes, for example, organotin compounds such as dibutyltin dimethoxide and dibutyltin dilaurate, organotitanium compounds such as tetra n-butyl titanate, organic acids such as acetic acid and methanesulfonic acid, inorganic acids such as hydrochloric acid and sulfuric acid. Out of these compounds preferred are acetic acid, tetra n-butyl titanate, and dibutyltin dilaurate.

The thickness of the stain-resistant layer can be selected appropriately as necessary. However, generally from the viewpoint of anti-reflection, stain resistance and harmony with hardness of the surface, it ranges preferably from 0.001 to 0.5 $\mu$m, more preferably from 0.01 to 0.1 $\mu$m. Incidentally, in formation of the stain-resistant layer, it is preferable to treat the surface of the anti-reflection layer to be clean in advance. The method of the treatment includes, for example, removing stain with a surface active agent, degreasing with an organic solvent, and steam washing with a fluorine-based solvent. In order to improve adhesion or durability, pretreatment may be optionally carried out, in particular treatment with an activated gas or washing with a chemical such as acid or alkali.

Anti-Reflection Film

The anti-reflection film used in the present invention preferably has 3% or less of degree of reflection at surface based on the degree of reflection of the entire lights on the stain-resistant layer located as the surface layer from the viewpoint of reflection prevention effect, etc. Accordingly, in the case where the anti-reflection film is formed at both of the front side surface and rear side surface of the supporting substrate to form an optical member described later, the total degree of reflection on both of the front and rear side surfaces is preferably 6% or lower. Incidentally, in a colorless and transparent optical member which has the anti-reflection film on both of the front and rear aide surfaces, degree of reflection at surface can be defined as the value obtained by subtracting the transmittance of the optical member for the entire light from 100% and then dividing the resulting value into halves.

When the degree of reflection at the surface of a stain-resistant layer is high, anti-reflection effect is poor, causing reflected images such as ghost or flare on the lenses of glasses or the like and hence unpleasant feeling. Also, in the case of looking glasses or filters for a CRT (Cathode Ray Tube) display, areal reflected light is formed and make the contents or indicated subjects unclear.

Meanwhile, in regard to the stain-resistant layer, the surface thereof can be analyzed using the TOF-SIMS (Time-Of-Flight Secondary Ion Mass Spectrometry). According to the method, when the surface of a specimen in a high vacuum is subjected to ions with low energy, the mass number of molecular fragments ejected out of the surface is detected according to decomposition with time. An apparatus and conditions for measurement using this method are described below. Apparatus for measurement: TFS-2000 (tradename, produced by Phisical Electronics (PHI EVANS)) Conditions for measurement:

| | |
|---|---|
| Primary ion species: | Ga (+) ion |
| Primary ion energy; | 25 kV |
| Primary ion electric current (DC): | approximately 150 pA |
| Electric potential of specimen: | +3.2 kV |
| Pulse frequency; | 7.2 kHz |
| Pulse width: | Approximately 10 ns |
| Hunting: | None |
| Neutralization of electrostatic charge: | Effected |
| Time resolution: | 1.1 ns/ch |
| Polarity of secondary ion: | positive, negative |
| Range of mass (M/z): | 0–10000 |
| Size of raster: | 120 $\mu$m□ |
| Time for measurement: | 20 minutes |
| Energy filter: | None |
| Contrast diagram: | #0 |
| Location detector: | Raster |
| Acceleration at the rear stage: | 5 kV |
| Degree of vacuum upon measurement: | Approximately 4 × 1/$10^8$ Torr |

Said anti-reflection film can be applied to any articles to which conventional anti-reflection films were applied, specifically, the inner surface or front surface of display units, e.g., LCD (Liquid Crystal Display). CRT display and plasma display, optical elements such as polarizing plate, lenses of glasses, cameras and binocular, mirrors such as glare-free mirror, display panels of measuring instrument such as a weighing meter. Thus, the anti-reflection film can be directly provided for an article as mentioned above as an object to be treated.

Optical Member

The anti-reflection film is formed on a supporting substrate to form an optical member. That is, the anti-reflection film can be formed on a substrate such as a sheet of glass, a sheet of plastic, or an optical element such as a polarizing plate or diffusion plate to form an optical member. The anti-reflection film can be formed on one side surface of a supporting substrate or the both sides thereof. As the supporting substrate, any materials can be used on a case-by-case basis, and there is no limitation. When an anti-reflection film is formed by a liquid coating method, a supporting substrate made of glass or plastic is preferably used.

When the supporting substrate is made of glass, it is preferred to incorporate a material with a low refractive index like $MgF_2$ or $CaF_2$ in the anti-reflection layer, because a good anti-reflection effect is obtained. When the substrate is made of plastic, it is preferred to incorporate a material with a relatively low refractive index and a high hardness like $SiO_2$ in the anti-reflection layer from the view point of durability and so forth.

In the case where the substrate is made of plastic, the plastic includes, for example, acrylic resins such as polymethyl methacrylate and methyl methacrylate copolymers, polycarbonate resins such as polycarbonate and diethylene glycol bisallyl carbonate (CR-39), polyester resins such as polyethylene terephthalate and unsaturated polyesters, acetate resins such as triacetylcellulose, acrylonitrile-styrene copolymers, styrene resins, polyvinyl chloride resins, polyurethane resins, epoxy resins, polyethersulfon resins, polyamide resins, polyimide resins, and polyolefin resins.

The shape of the supporting substrate may be any of film, sheet, plate, and so forth, and the thickness thereof is not limited. The supporting substrate may be provided with a hard coat layer. In that case, it is provided between the anti-reflection film and the supporting substrate.

Furthermore, the supporting substrate may have been coated with an appropriate layer or surface-treated for the purpose of, e.g., improving the adhesion, hardness, chemical resistance, durability, dye affinity and so forth of the anti-reflection film.

To improve the hardness, materials for improving hardness disclosed in the Japanese Post-examination Patent Publication (kokoku) Nos. 50-28092, 50-28446, 50-39449, 51-24368, and 57-2735, and Japanese Laid-Open Patent Publication (kokai) No. 52-112698. It is also possible to form a coating of an oxide of metals such as titanium, aluminum or tin, or silicon, or a layer of acrylic crosslinked product such as (meth)acrylic acid crosslinked with pentaerythritol or the like.

Said hard coat layer can also be formed according to the conventional methods. The hard coat layer is preferably comprised of a cured product of an organosilicon compound, particularly an organosilicon compound represented by the general formula: $R^4_x R^5_y Si(OR^6)_{4-x-y}$ or its hydrolysates wherein $R^4$ and $R^5$ are each an alkyl group, alkenyl groups, aryl groups with 1 to 6 carbon atoms, or hydrocarbon groups having a halogen atom, epoxy group, glycidoxy group, amino group, mercapto group, methacryloyloxy group, or cyano group, and $R^6$ is an alkyl group with 1 to 8 carbon atoms, alkoxyalkyl group, acyl group, or aryl group, and x and y are each 0 or 1; therefore, x+y amounts to 0, 1 or 2.

Into the hard coat layer may optionally be incorporated particles with an average diameter of 0.5–5 μm of silica or metalic oxides obtained by, for example, the sol-gel method.

Furthermore, the supporting substrate may be provided with a layer with a function of preventing sparkling which can be formed by methods using buff, corona discharge, or ion etching, for instance, to make the surface to have a center-line mean roughness of 0.01 to 0.5 μm.

The anti-reflection film and optical members according to the present invention have the following advantages and this performance is durable for a long period of time. They become stained with difficulty. If they are stained, the stain is inconspicuous and can be easily removed. Their surfaces have good lubricity and therefore are damaged with difficulty; thus these properties are maintained for a long period of time. Consequently, anti-reflection film or the optical member can be favorably used on the surface or on a filter or the like positioned inside of various articles, e.g., a variety of display units, such as LCD, a variety of optical elements such as polarizing plates, a variety of lenses like ones for glasses, telescopes, microscopes, a variety of prisms, a variety of mirrors such as common mirrors, glare-free mirror and stereoscopes, indicating panels for a variety of measuring instruments such as weighing instrument.

EXAMPLES

The present invention is now described specifically with reference to Examples, but the present invention is not limited thereto.

Synthesis Example 1

In a reaction vessel were charged 60 g of a mixture of 92.4% by weight of a fluorine-containing chlorosilane having the formula: $C_8F_{17}CH_2CH_2SiCl_3$ and 7.6% by weight of dimethylpolysiloxane represented by the formula:

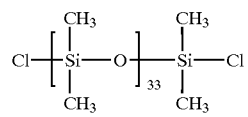

and 200 mL of m-xylene hexafluoride. After the mixture in the reaction vessel was cooled to 5° C., ammonia gas was blown into the mixture to allow reaction to take place for 4 hours, while the reaction solution is maintained at 20° C. or lower. Thereafter, the reaction solution was heated and refluxed for 30 minutes, thereby excess ammonia being removed, and then after cooling by-produced ammonium chloride was filtered off to obtain a colorless transparent fluorine-containing polysilazane solution.

Synthesis Example 2

In a reaction vessel were charged 60 g of a mixture of 93.2% by weight of a fluorine-containing trichlorosilane represented by the formula:

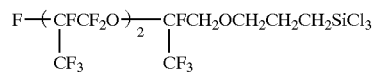

and 6.8% by weight of the same dimethylpolysiloxane as used in Example 1, and 200 mL of m-xylene hexafluoride. Thereafter, the mixture was processed in the same manner as in Example 1 to produce a colorless and transparent fluorine-containing polysilazane solution.

Synthesis Example 3

In a reaction vessel were charged 60 g of a mixture of 92.4% by weight of a fluorine-containing trichlorosilane represented by the formula:

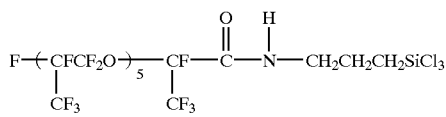

and 7.6% by weight of the same dimethylpolysiloxane as used in Example 1, and 200 mL of m-xylene hexafluoride. Thereafter, the mixture was processed in the same manner as in Example 1 to produce a colorless and transparent fluorine-containing polysilazane solution.

Synthesis Example 4

60 g of a fluorine-containing chlorosilane represented by the formula:
$C_8F_{17}CH_2CH_2SiCl_3$ and 200 mL of m-xylene hexafluoride were charged in a reaction vessel, and then were processed in the same manner as in Example 1, to obtain a colorless and transparent fluorine-containing polysilazane solution.

Examples 1–3

On a hard coat layer of a UV curable acrylic resin provided on a polyester film, five layers of an $SiO_2$ layer, a $TiO_2$ layer, an $SiO_2$ layer, a $TiO_2$ layer, and an $SiO_2$ layer each having an optical thickness of $\lambda/4$ (where $\lambda$ equals 540 nm) were laminated in this sequence to form an anti-reflection layer.

Subsequently, each of the fluorine-containing polysilazane solutions obtained in Synthesis Examples 1–3 was diluted with nonafluorobutyl ethyl ether (tradename: HFE-7200, produced by 3M Co.) to prepare a coating solution with a concentration of 0.3% by weight. In this solution, the film provided with said hard coat layer and the anti-reflection layer was dipped, and then raised at a rate of 20 cm/min. The film thus coating treated was left to stand at room temperature all day and night to cure the coating layer, thus forming a stain-resistant layer. Thus, an optical member having an anti-reflection film was obtained.

Comparative Example 1

An optical member was produced in the same manner as in Examples, except that the stain-resistant layer was not formed.

Comparative Example 2

An optical member was produced in the same manner as in Examples, except that the fluorine-containing polysilazane solution prepared in Synthesis Example 4 was used for preparation of a coating solution.

The optical members produced in Examples and Comparative Examples were investigated for properties according to the following evaluation methods.

Anti-reflection

Light with a wavelength of 500 nm was made incident upon an object with an angle of incidence of 15 degrees. Using a spectrophotometer (tradename: MPS-2000, produced by Shimadzu Corp.), an absolute mirror reflectivity was measured.

Stain Resistance

Fingers were pressed on the forehead for two minutes, and then the fingers were pressed on the surface of a stain-resistant layer for 5 seconds so that fingerprint was attached thereon. The conditions of the fingerprint was evaluated visually. Subsequently, cleanability was evaluated by trying to wipe the fingerprint off with tissue paper. Evaluation was made according to the following criteria.

○: Fingerprint was inconspicuous, and could be wiped off with ease.
Δ: Fingerprint was conspicuous, and could be wiped off with difficulty.
X: Fingerprint was seriously conspicuous, and could not be wiped off.

Static Contact Angle to Oleic Acid

A drop with a diameter of 1.5 mm was formed at the end of a needle, brought into contact with the surface of a stain-resistant layer, and then transferred on the surface, The static contact angle between the drop and the surface was measured using a contact measurer (Model CA-D, produced by Kyowa Interface Science Co., Ltd.).

Durability

The surface of a stain-resistant layer was rubbed with an unwoven fabric impregnated with isopropyl alcohol 20 times. Thereafter, a static contact angle to oleic acid was measured in the same manner as described above.

The results are given in the following table.

TABLE 1

|  | Examples | | | Comparative Examples | |
| --- | --- | --- | --- | --- | --- |
|  | 1 | 2 | 3 | 1 | 2 |
| Anti-reflection (%) | 0.22 | 0.22 | 0.24 | 0.22 | 0.23 |
| Stain resistance | ○ | ○ | ○ | x | Δ |
| Static contact angle (degree) | 75 | 77 | 78 | 17 | 77 |
| Durability (degree) | 73 | 74 | 74 | 17 | 61 |

The results in the table show that in Examples, the anti-reflection films are stained with fingerprint or the like with difficulty, and if they are stained, the stain like fingerprint can be wiped off with ease. Furthermore, the effects are maintained for a long period of time, and water repellency and oil repellency are also excellent.

As described above, the anti-reflection film according to the present invention is stained with difficulty, and if it is stained, the stain is not conspicuous. The stain attached thereon including human-derived stain such as dirt from hands or fingerprint can be wiped off with tissue paper with ease. The anti-reflection film is damaged with tissue paper with difficulty, and attached matter like water drops can be shaken off with ease. Furthermore, the performance of these stain resistance, wipe off cleanability, mar resistance, water and oil repellency, etc. is maintained for a long period of time. The optical members having the anti-reflection film on a supporting substrate have the same good performance.

What is claimed is:

1. An anti-reflection film comprising an inorganic anti-reflection layer comprising a silicon dioxide-based inorganic layer and having a monolayer structure or a plurallayer structure, and a stain-resistant layer provided as a surface layer, said stain-resistant layer comprising a cured fluorine-containing silazane block polymer represented by formula (1):

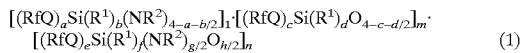   (1)

wherein $R^1$ are the same or different and each is a hydrogen atom, or an unsubstituted or substituted monovalent hydrocarbon group; $R^2$ are the same or different and each is a hydrogen atom or an alkyl group; Rf are the same or different and each is a perfluoroalkyl group with 1–20 carbon atoms or perfluoroalkylether group with 2–35 carbon atoms; Q is a divalent organic group with 2–5 carbon atoms; in each of the first structural units, independently, a is an integer of 1–3, and b is an integer of 0–2, wherein a+b is an integer of 1–3; in each of the second structural units, independently, c is an integer of 0–2, and d is an integer of 1–3, wherein c+d is an integer of 1–3; in each of the third structural units, e and f independently is an integer of 0–2, and g and h each is an integer of 1 or 2, wherein e+f+g+h=4; and l, m and n are each a number of 1 or greater.

2. The anti-reflection film according to claim 1, wherein $R^1$ are the same or different and each is an unsubstituted or substituted monovalent hydrocarbon group with 1–10 carbon atoms; $R^2$ is a hydrogen atom; Rf are the same or different and each is a perfluoroalkyl group having the formula $C_iF_{2\,i+1}$, wherein i is an integer of 1–20, or a perfluoroalkylether group having the formula:

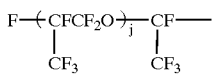

where j is and an integer of 1 to 50; Q is an alkylene group with 2–5 carbon atoms, etheric oxygen atom-containing alkylene group with 2–5 carbon atoms or an alkyleneamide group; l+m ranges from 10 to 500; and n is an integer of 2 to 100.

3. The anti-reflection film according to claim 1, wherein $R^1$ are the same or different and each is an unsubstituted or substituted monovalent hydrocarbon group with 1–6 carbon atoms; Q is a divalent group represented by the formula:
—$CH_2CH_2$—, —$CH_2CH_2CH_2$—, —$CH_2OCH_2CH_2CH_2$—, or —$CONHCH_2CH_2CH_2$—, and n is an integer of 5 to 70.

4. The anti-reflection film according to claim 3, wherein $R^1$ are the same or different and each is a 3,3,3-trifluoropropyl group, or a group represented by the formula: $CF_3CF_2CF_2CH_2CH_2$—.

5. The anti-reflection film according to claim 1, wherein the fluorine-containing silazane block polymer is produced by reacting an organosilane represented by formula (2):

   (2):

wherein X is a halogen atom, and an organopolysiloxane represented by the average compositional formula (3):

   (3)

wherein $0 \leq p<3$, $0<q<3$, and $0<r<3$, and p+q+r<4, with at least one compound selected from the group consisting of ammonia and a primary amine.

6. The anti-reflection film according to claim 1, wherein said inorganic anti-reflection layer has a nanolayer structure comprising a silicon dioxide-based inorganic layer.

7. The anti-reflection film according to claim 1, wherein said inorganic anti-reflection layer has a plural layer structure in which the layer adjacent to said stain-resistant layer comprises a silicon dioxide-based inorganic layer.

8. An optical member comprising a supporting substrate and an anti-reflection film as defined in claim 1, wherein the antireflection film is on the supporting substrate.

9. The optical member according to claims 8, wherein said supporting substrate is a display panel of display units, an optical element, a lens, a prism, a mirror, or a display panel of measuring instrument.

10. The optical member according to claim 8, wherein said supporting substrate is selected from the group consisting of an LCD, a polarizing plate, a phase plate, a lens for glasses, a telescope, a microscope, a prism, a reflecting mirror, a stereoscope, a glare-free mirror, and a display panel for a weighing meter.

11. An antireflection film comprising an inorganic anti-reflection layer comprising a silicon dioxide-based inorganic layer and having a monolayer structure or a plurallayer structure, and a stain resistant layer provided as a surface layer, said stain resistant layer comprising a cured fluorine-containing silazane block polymer represented by the formula (I):

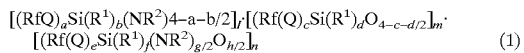   (1)

wherein $R^1$ are the same or different and each is a hydrogen atom, or an unsubstituted or substituted monovalent hydrocarbon group; $R^2$ are the same or different and each is a hydrogen atom or an alkyl group; Rf are the same or different and each is a perfluoroalkyl group with 1–20 carbon atoms or perfluoroalkylether group with 2–35 carbon atoms; Q is a divalen organic group with 2–5 carbon atoms; in each of the first structural units, independently, a is an integer of 1–3, and b is an integer of 0–2, wherein a+b is an integer of 1–3; in each of the second structural units, independently, c is an integer of 0–2, and d is an integer of 1–3, wherein c+d is an integer of 1–3; in each of the third structural units, e and f independently is an integer of 0–2, and g and h each is an integer of 1 or 2, wherein e+f+g+h=4; and l, m, and n are each a number of 1 or greater, wherein the fluorine-containing silazane block polymer is produced by reacting an organosilane represented by formula (2):

   (2)

wherein X is a halogen atom, and an organopolysiloxane represented by the average compositional formula (3)

   (3)

wherein $0 \leq p<3$, $0<q<3$, $0<r<3$, and p+q+r<4,
with at least one compound selected from the group consisting of ammonia and a primary amine.

12. The anti-reflection film of claim 1, wherein the inorganic anti-reflection layer further comprises an organopolysiloxane.

13. The anti-reflection film of claim 1, wherein the silicon dioxide-based inorganic layer has a monolayer structure.

14. The anti-reflection film of claim 1, wherein the silicon dioxide-based inorganic layer has a plurallayer structure.

15. The anti-reflection film of claim 1, wherein n is an integer of from 5 to 70.

16. The anti-reflection film of claim 1, wherein m/(l+m) is from 0.05 to 0.5.

17. The anti-reflection film of claim 5 wherein the organopolysiloxane is a polydimethylsiloxane.

18. The anti-reflection film of claim 1, wherein the fluorine-containing silazane block polymer is cured with a hydrolysis-condensation catalyst.

19. The anti-reflection film of claim 1, wherein the stain-resistant layer has a thickness of 0.001 to 0.5 µm.

* * * * *